(12) United States Patent
Posada Moreno

(10) Patent No.: US 10,104,874 B2
(45) Date of Patent: Oct. 23, 2018

(54) APPARATUS FOR THE MEASUREMENT OF THE ANGLE OF THE KEEL AND THE LENGTH OF THE TARSUS ON BIRDS

(71) Applicant: Premex S.A., Medellin (CO)

(72) Inventor: Andres Felipe Posada Moreno, Envigado (CO)

(*) Notice: Subject to any disclaimer, the term of this patent is extended or adjusted under 35 U.S.C. 154(b) by 186 days.

(21) Appl. No.: 15/337,818

(22) Filed: Oct. 28, 2016

(65) Prior Publication Data

US 2018/0116180 A1    May 3, 2018

(51) Int. Cl.
| | |
|---|---|
| *A61B 5/107* | (2006.01) |
| *A01K 45/00* | (2006.01) |
| *G01B 3/56* | (2006.01) |

(52) U.S. Cl.
CPC .............. *A01K 45/00* (2013.01); *G01B 3/56* (2013.01)

(58) Field of Classification Search
CPC .......... A01K 45/00; A61B 5/107; G01B 3/56
USPC .................... 33/465, 471, 485, 494
See application file for complete search history.

(56) References Cited

U.S. PATENT DOCUMENTS

| | | | | |
|---|---|---|---|---|
| 2001/0037581 A1* | 11/2001 | Akhavan-Sigari | ... | A61B 5/1071 33/807 |
| 2010/0043243 A1* | 2/2010 | Li | ............ | B43L 7/10 33/471 |
| 2014/0115912 A1* | 5/2014 | Krijnen | ......... | G01B 3/166 33/808 |
| 2016/0025475 A1* | 1/2016 | Neugartner | ......... | G01B 3/06 33/458 |
| 2018/0085610 A1* | 3/2018 | Aroonsawat | ......... | A62B 3/005 |

* cited by examiner

*Primary Examiner* — G. Bradley Bennett
(74) *Attorney, Agent, or Firm* — Law Office of Jeff Williams; J. Oliver Williams

(57) ABSTRACT

The present invention is related to the medical science or the veterinary field, more specifically with the detection, measurement or recording with diagnostic purpose, and in particular it provides an apparatus for the measurement of the angle of the keel and the length of the tarsus in birds for the purpose of evaluating its corporal condition, that comprises: a first elongated piece having a first straight portion; a second elongated piece having a second straight portion; and an axis of rotation of the first piece with respect to the second piece; wherein one of said first and second pieces presents a scale for measuring the length in its corresponding straight portion; and wherein one of said first and second pieces presents a scale for measuring the angle formed between said first and second pieces.

8 Claims, 3 Drawing Sheets

APPARATUS FOR THE MEASUREMENT OF THE ANGLE OF THE KEEL AND THE LENGTH OF THE TARSUS ON BIRDS

BACKGROUND

1. Field of the Invention

The present invention is related to the medical science or the veterinary field, more specifically to the detection, measurement or recording with diagnostic purpose, and in particular it provides an apparatus for the measurement of the angle of the keel and the length of the tarsus in birds for the purpose of evaluating its corporal condition.

2. Description of Related Art

In egg production, the physiological conditions of the hens are of vital importance. These directly influence the quality and size of the eggs, as well as the amount of weeks that the hen can be in a phase of production. Therefore, it is important to monitor the medical condition of the hens during their production lifetime, which is approximately between weeks 20 and 100 of its life.

An index that allows us to infer how healthy or not the hen is is the "qualification of corporal condition" or the "qualification of the breast muscle". This qualification is based on the morphology of the keel of the animal, specifically on the angle of the keel and the level of corporal fat. This index allows the control of the amount of nutrients that a hen needs to be in an ideal state of posture.

While in prior art methods have been developed that enable a relation between the angle of the keel and the corporal condition, in general the measurement of said angle is done with the use of a goniometer (for example in the documents: Quintana (2011), "Effect of crude protein, metabolizable energy, and food consumption on productivity, hatchability, serum lipid content, eggs, and sexual hormones of reproductive heavey hen" Dissertation, University of Colima; and Mèdez (2010), "Comparative Characterization of the Balearic Hens", Master Thesis, University of Còrdoba). However, the use of a goniometer presents the difficulty of giving few reproducible measurements and, further, the obtained result is not a prompt and unequivocal indicator of the animal's corporal condition.

In order to generate more reproducible measurements, in the prior art, methods and instruments that allow a more controlled way to measure the angles have been proposed. For example, Reid, and cols (Can. J. Anim. Sci 64:769-772 [1984]), describe four instruments that allow the simultaneous measurement of the height of the breast and the angle of the breast that contains a vertical pole and a perpendicular arm that moves along said pole. At the end of the arm that is opposite to the pole, there is an instrument for measuring the angle of the breast. The instrument for the measurement of the angle is described with more detail by Voisey, and cols (Poultry Science 45 (3): 642-643 [1966]) and includes two pivot arms with respect to an axis. One of the said arms has a scale for the measurement of the angle and the other one, an indicator that passes over the scale. Additionally, it has a torsion spring applying a small pressure when the arms open one with respect to the other.

Additionally, the measurement of the bird's tarsus provides a reference scale for the body measurements of the animal. The measurement of the tarsus is done with an additional instrument to the one used to measure the angle, normally a calliper, increasing the time required for corporal measurements. No apparatus are observed in the prior art that measure both the angle of the keel and the length of the tarsus of the bird.

SUMMARY OF THE INVENTION

The present invention refers to an apparatus for measuring the angle of the keel and the length of the tarsus in birds, which is characterized because it comprises: a first long piece having a first straight portion; a second long piece having a second straight portion; and a rotation axis of the first piece with respect to the second that unites them; wherein one of said first and second pieces has a scale for measuring the length; and wherein one of said first and second pieces presents a scale of measurement of the angle formed by said first and second pieces.

In a preferred embodiment, the apparatus for measuring the angle of the keel and the length of the tarsus in birds is characterized because said first and second pieces present a curved portion next to the rotation axis that unites them; and a protruding portion next to the curved portion in a position opposite to the rotation axis. In a further preferred embodiment, the distance between the axis of rotation and the point of highest height of the protruding portion is between 30 mm and 40 mm and the highest height of the protruding portion is greater than 5 mm.

In another preferred embodiment, the apparatus for measuring the angle of the keel and the length of the tarsus in birds is characterized because said first and second pieces present a ring portion at the opposite end, with respect to the axis, to the curved portion and the protruding portion. In an additional preferred embodiment, the first piece presents a protuberance next to the ring portion and the second piece presents a perforation, next to the ring portion.

In an additional preferred embodiment, the apparatus for measuring the angle of the keel and the length of the tarsus in birds is characterized because the piece with the scale for measuring the length presents an optional protruding portion that forms a right angle with respect to said scale for measuring the length. Said scale for measuring the length has a length greater than 120 mm.

In another preferred embodiment, the apparatus for measuring the angle of the keel and the length of the tarsus in birds is characterized because said scale for measuring the angle formed between said first and second pieces is labeled to indicate the corporal condition of the bird.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
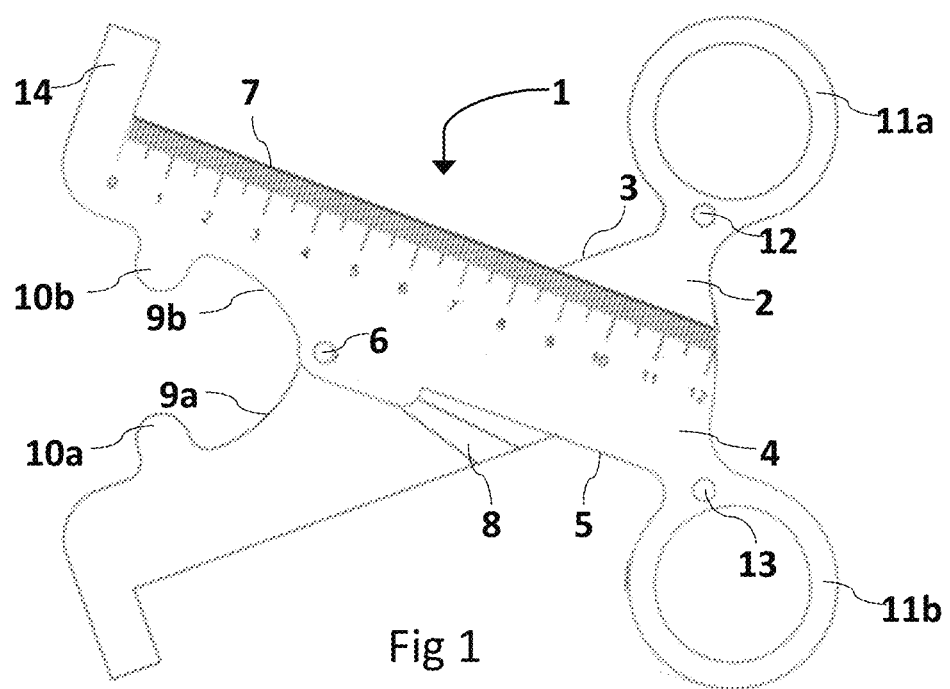
FIG. 1 shows an open view of a first preferred embodiment of the apparatus for measuring the angle of the keel and the length of the tarsus in birds that is object of the present invention.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

While the problem giving rise to the present invention was first identified in raising of laying hens, a specialist in the technical field will notice that the apparatus for measuring the angle of the keel and the length of the tarsus in birds that is object of the present invention can be used for any type of bird, whether focused or not on breeding.

Henceforward there is a detailed description of the invention using the figures as reference. FIG. 1 presents an open view of a first preferred embodiment of the apparatus for measuring the angle of the keel and the length of the tarsus (1) of the present invention. Said apparatus (1) includes, in an essential way, a first piece (2) that presents a first straight portion (3) and a second piece (4) that presents a second straight portion (5); and an axis of rotation (6) of the first piece (2) with respect to the second piece (4). Although a first piece (2) and a second piece (4) were mentioned, it must be understood that said distinction is made with the purpose of providing a better understanding of the present invention but does not limit the scope of the same. Furthermore, when along the application there is mention of "the main pieces (2 and 4)" it must be understood that said expression may refer to the first piece (2), the second piece (4), or both pieces (2 and 4).

One of said pieces (2,4) presents a scale for measuring the length (7) that allows the measurement of the tarsus of the bird. Additionally, one of said pieces (2,4) presents a scale for the measurement of the angle (8) formed between said straight portions (3,5) of the two main pieces (2 and 4) that allows the measurement of the keel angle of the bird. Although the figures show that one of the pieces (2) has the scale for the measurement of the angle (8) and the another piece (4) has the scale for measuring the length (7), a person ordinarily skilled in the relevant art will notice that said measurement scales (7 and 8) can be present in only one of said main pieces (2 or 4), or in both without this affecting the scope of the present invention.

Each of the said pieces (2 and 4) also presents a curved portion (9a and 9b) next to the axis of rotation (6) and a protruding portion (10a and 10b) next to the curved portion (9a and 9b), in a position opposed to the axis of rotation (6) with respect to the corresponding curved portion (9a and 9b). Said curved portions (9a and 9b) and the protruding portions (10a and 10b) allow the positioning of the apparatus for measuring the angle of the keel and the length of the tarsus of birds (1) that is the object of the present invention in the area of the bird that is to be measured, in this case the keel, providing a supporting point for the tip of the keel, which is near to the axis of rotation (6), and two supporting points in the lateral muscles of the keel of the bird, provided by the protruding portions (10a and 10b). Thus, it is possible to obtain measurements of the angle of the keel in a reproducible and fast way.

In a preferred embodiment of the invention, without limiting the scope of the protection sought, each one of the main pieces (2 and 4) presents a ring portion (11a and 11b) in the opposite ends, with respect to the axis (6), to the curved portion (9), and the protruding portion (10). Said ring portions (11a and 11b) provide the apparatus with a handling area, similarly to scissors or clamps. Although the figures represent ring portions (11a and 11b) in a circular form, a person ordinarily skilled in the relevant art will notice that any form that allows the manipulation of the apparatus for measuring the angle of the keel and the length of the tarsus of birds (1) may be used without limiting the scope of the present invention.

Figure 2:
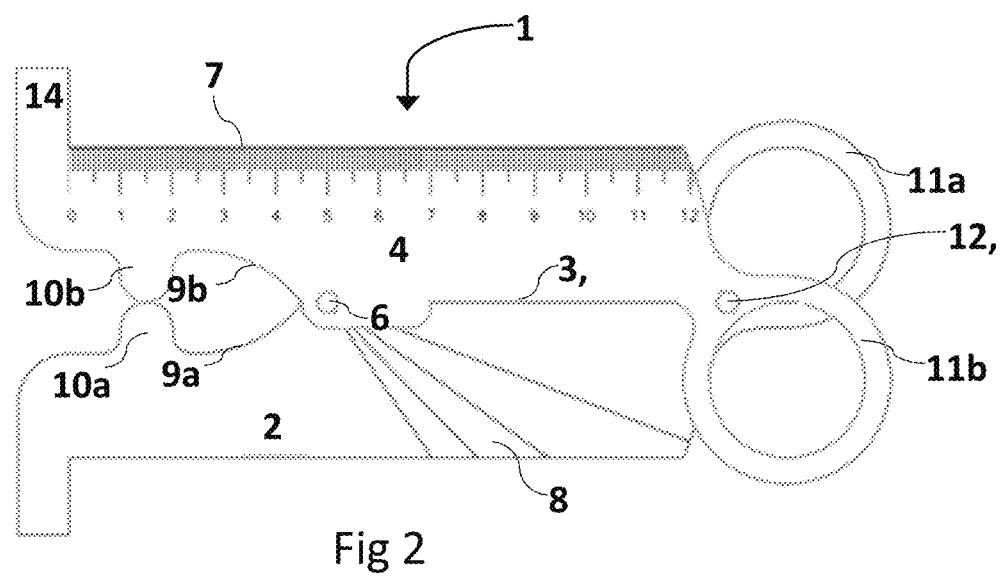
FIG. 2 shows a closed view of a first preferred embodiment of the apparatus for measuring the angle of the keel and the length of the tarsus in birds that is object of the present invention.
Figure 4:
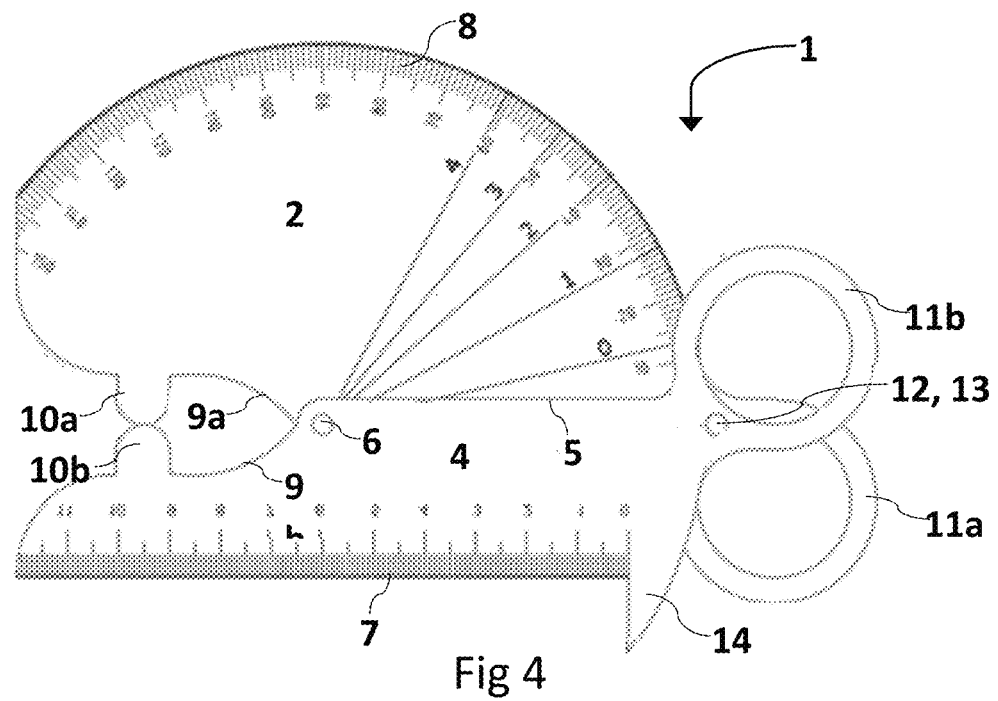
FIG. 4 shows a closed view of a second preferred embodiment of the apparatus for measuring the angle of the keel and the length of the tarsus in birds that is object of the present invention.

Additionally, in a preferred embodiment, the first piece (2) may present a protuberance (12) next to the ring portion (11a), while the second piece (4) may present a perforation (13), that is complementary to the protuberance (12), next to its corresponding annular portion (11b). In said way, a male-female joint is provided which functions as a closure system that allows the reduction of the space occupied by the apparatus for measuring the angle of the keel and the length of the tarsus of birds (1) which is the object of the present invention when it is not in use. FIGS. 2 and 4 present the invention where the apparatus is in a closed position and where it may be observed that the protuberance (12) interacts with perforation (13), maintaining the apparatus in said closed position.

Optionally, and without limiting the scope of the invention, the piece that presents the scale for measuring the length (7) may present, additionally, a protruding portion that possesses a straight section that forms a right angle with the scale for measuring the length (7). This protruding portion (14), and its corresponding straight section, provides a supporting point for the tarsus of the bird, in order to obtain reproducible measurements of the length of the tarsus of a bird.

In an additional preferred embodiment, and without limiting the scope of the present invention, the first piece (2) has, essentially, the same form as the second piece (4). This is the case observed in FIGS. 1 and 2, where it is observed that the difference between the first piece (2) and the second piece (4) lies only in the presence of the protuberance (12)-perforation (13) pair and that one presents the scale for measuring the length (7) while the other presents the scale for measuring the angle (8). Nevertheless, without limiting the scope of the present invention, it is beneficial for both pieces to present both the scale for measuring the length (7) as well as the scale for measuring the angle (8), therefore having the same shape, since this case allows a more efficient manufacturing of the apparatus, for example and without limiting the scope of the invention, in a polymeric material by laser cutting, sheet or injection, reducing the costs associated with its production.

Figure 3:
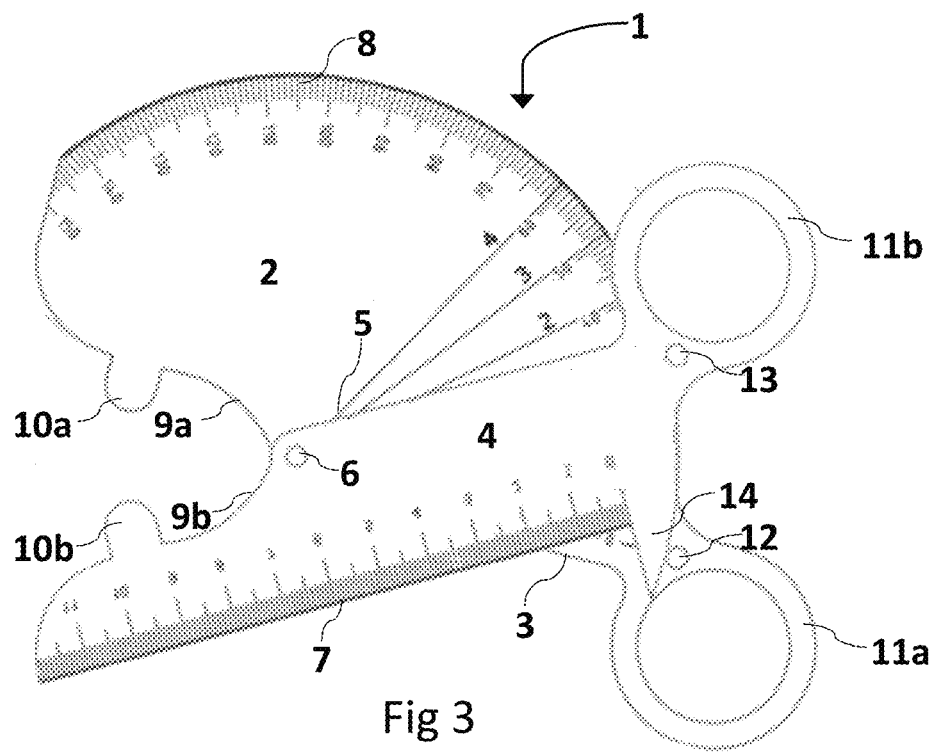
FIG. 3 shows an open view of a second preferred embodiment of the apparatus for measuring the angle of the keel and the length of the tarsus in birds that is object of the present invention.

On the other hand, in FIGS. 3 and 4 it is observed that the first piece (2) may have a different form from the second piece (4), wherein one presents a scale for measuring the angle (8) and the other one presents a scale for measuring the length (7). In said FIGS. 3 and 4 it is observed that the first piece (2) presents a scale for measuring the angle (8) both in the form of straight indicators (labeled from 0 to 4) and in the form of degrees (labeled from 0° to 150°). Thus, the straight indicators identify ranges for the values of the keel angle which correspond to indicators of the corporal condition of the bird, also allowing a fast and reproducible diagnosis of said condition. Additionally, it is observed that the second piece (4) presents, next to the scale for measuring the length (7) but in a position close to the ring portion (11b), a protruding portion (14) that forms a right angle with the scale for measuring the length (7) and fulfills the function of being a supporting point for the tarsus of the bird.

With the description previously detailed it is possible to provide, advantageously, a single apparatus for measuring the angle of the keel and the length of the tarsus of birds (1), which allows the performance of said measurements in a quick and reproducible way, and by unqualified personnel.

Next, there are present examples of applications for the apparatus for measuring the angle of the keel and the length of the tarsus of birds (1) of the present invention. It must be considered that the objective of said examples is to allow a better understanding of the present invention but in no case limiting the scope of the same.

EXAMPLES

Example 1: Application to Laying Hens

In the case of white laying hens, of Lohmann LSL and by line w36 race, the inventors have proved that it is possible to use the apparatus for measuring the angle of the keel and the length of the tarsus of birds (1) providing a quick, reproducible, and low cost diagnosis of the corporal condition of said hens. To achieve this objective, an apparatus according to the form of FIGS. 1 and 2 was made, in which the distance between the axis of rotation (6) and the highest point of each protruding portion (10a and 10b) is between 30 mm and 40 mm and the height of said protruding portion (10) is greater than 5 mm. Additionally, the scale for measuring the length (7) of the apparatus has a length greater than or equal to 120 mm. With the previously given measurements, the inventors have achieved an angle measuring scale (8), that is an immediate indicator of the corporal condition of the hens of the previously mentioned races, which is labeled from 0 to 4 and coincides with the rating of the breast muscle known in the prior art.

Example No. 2: Use of the Apparatus

In order to use the apparatus of the previous example in an appropriate way, the following steps were performed:

In first place, the hen was positioned with the keel facing up. Then the apparatus was opened and positioned on the keel, between 1 and 4 cm of the highest part of the keel, forming a right angle with the same. It was verified that the edge of the keel was contacting the curved portions (9a and 9b). Then the apparatus was carefully closed until the person doing the measurement could feel the contact between the apparatus and the hen. It was verified that the protruding portions (10a and 10b) were contacting the bird. With the apparatus in the previous position, the measurement of the angle of the keel could be read using the scale for measuring the angle (8) and the straight portion (5).

Figure 5:
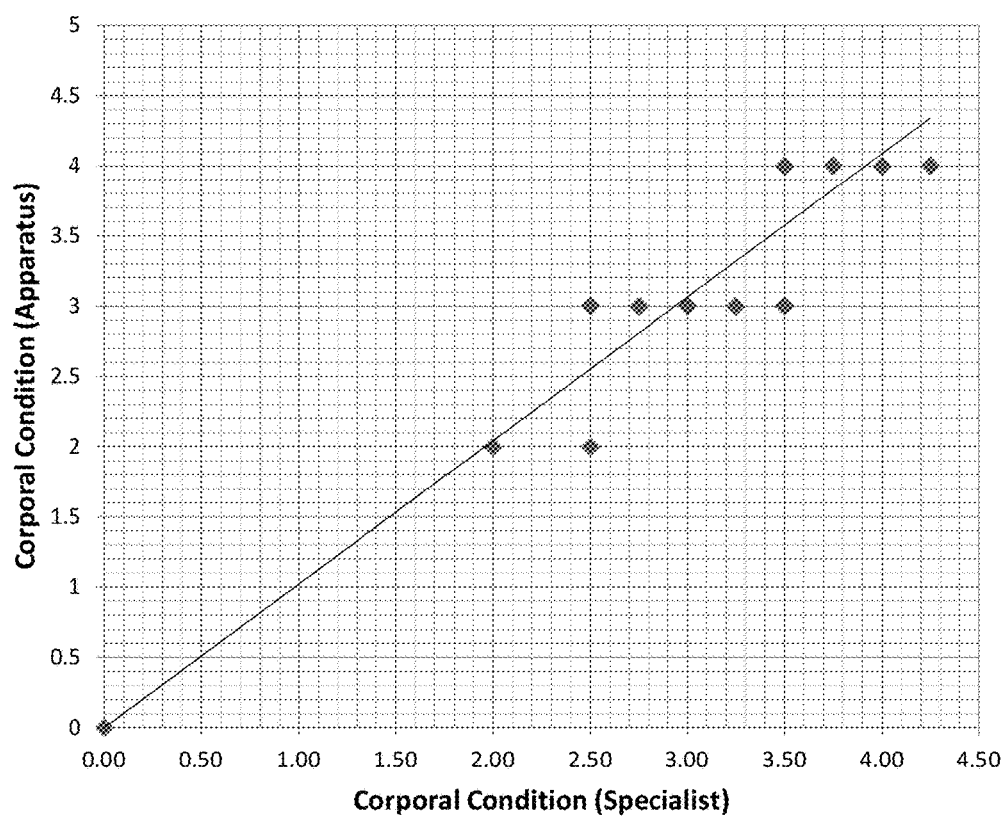
FIG. 5 shows a plot comparing the measurement of the angle of the keel in hens using the apparatus of the present invention and the estimation of the corporal condition of said hens by a specialist.

Example No. 3: Comparison Between the Measurements of the Angle and the Corporal Condition Using the previously described apparatus and procedure, the angle of the keel of 32 hens were measured. Independently, a specialist in the diagnosis of the corporal condition of the hens estimated the corporal condition of said 32 hens. The FIG. 5 shows the plot of the results, showing a good agreement between the measurements using the apparatus of the present invention and the estimation of a specialist.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. The apparatus for measuring the angle of the keel and the length of the tarsus of birds (1), wherein it comprises:
   a first piece (2) that presents a first straight portion (3);
   a second piece (4) that presents a second straight portion (5); and
   an axis of rotation (6) of the first piece (2) with respect to the second piece (4);
   wherein one of said first (2) and second pieces (4) presents a scale for measuring the length (7);
   wherein one of said first and second pieces (2, 4) presents a scale for measuring the angle (8) formed between said first and second straight portions (3, 5); and
   wherein each of said first and second pieces (2, 4) presents one curved portion (9a, 9b) next to the axis of rotation (6); and one protruding portion (10a, 10b) next to the curved portion (9a, 9b) in a position opposed to the axis of rotation (6).

2. The apparatus for measuring the angle of the keel and the length of the tarsus of birds of claim 1, wherein each said first and second pieces (2, 4) present a ring portion (11a, 11b) in the end that opposes, with respect to the axis (6), to the curved portion (9), and the protruding portion (10).

3. The apparatus for measuring the angle of the keel and the length of the tarsus of birds of claim 2, wherein the first piece (2) presents a protuberance (12) next to the ring portion (11a) and the second piece presents a perforation (13), complementary to said protuberance (12), next to the ring portion (11b).

4. The apparatus for measuring the angle of the keel and the length of the tarsus of birds of claim 1, wherein the distance between the axis of rotation (6) and the point of greatest height of the protruding portion (10) is between 30 mm and 40 mm.

5. The apparatus for measuring the angle of the keel and the length of the tarsus of birds of claim 1, wherein the greatest height of the protruding portion (10) is greater than 5 mm.

6. The apparatus for measuring the angle of the keel and the length of the tarsus of birds of claim 1, wherein the piece that presents the scale for measuring the length (7) presents a protruding portion (14) that forms a right angle with respect to said scale for measuring the length (7).

7. The apparatus for measuring the angle of the keel and the length of the tarsus of birds of claim 1, wherein said scale for measuring the length (7) has a length greater or equal to 120 mm.

8. The apparatus for measuring the angle of the keel and the length of the tarsus of birds of claim 4, wherein the greatest height of the protruding portion (10) is greater than 5 mm.

* * * * *